United States Patent [19]

Rude et al.

[11] 4,433,765

[45] Feb. 28, 1984

[54] SPRING CLUTCHES

[75] Inventors: Edward T. Rude, Fairfield; Jules Nisenson, Stamford; Martin Waine, Riverside, all of Conn.

[73] Assignee: General Clutch Corp., New York, N.Y.

[21] Appl. No.: 417,227

[22] Filed: Sep. 13, 1982

[51] Int. Cl.³ .......................... F16D 7/02; F16D 1/00; F16D 49/20

[52] U.S. Cl. .................................... 192/41 S; 192/52; 192/56 C; 192/81 C; 188/77 W

[58] Field of Search ................ 192/56 C, 33 C, 52, 192/81 C, 26, 28, 41 S, 43; 188/77 W, 196 D; 464/57, 60

[56] References Cited

U.S. PATENT DOCUMENTS

| | | | |
|---|---|---|---|
| 773,320 | 9/1903 | Haase | 464/57 |
| 2,487,280 | 11/1949 | Starkey | 192/56 C |
| 3,529,703 | 9/1970 | Kroeker | 192/41 S |
| 3,920,106 | 11/1975 | Nisenson | 192/33 C |
| 4,318,314 | 3/1982 | Furedi et al. | 192/41 S |
| 4,372,432 | 2/1983 | Waine et al. | 192/43 |

Primary Examiner—Rodney H. Bonck
Assistant Examiner—James J. Merek
Attorney, Agent, or Firm—Gottlieb, Rackman and Reisman

[57] ABSTRACT

A spring clutch which has multiple springs disposed between two coaxially mounted cylindrical elements. The springs are designed to slip so that all of the springs are required to support the maximum load. During the onset of rotation, tabs at the ends of the springs contact the load surfaces on one of the cylindrical elements sequentially, with some slippage occurring, so that impulse is reduced. In different embodiments, either releasing or reversing the clutch re-establishes offsets between spring tabs so that the sequential contact can again occur.

7 Claims, 11 Drawing Figures

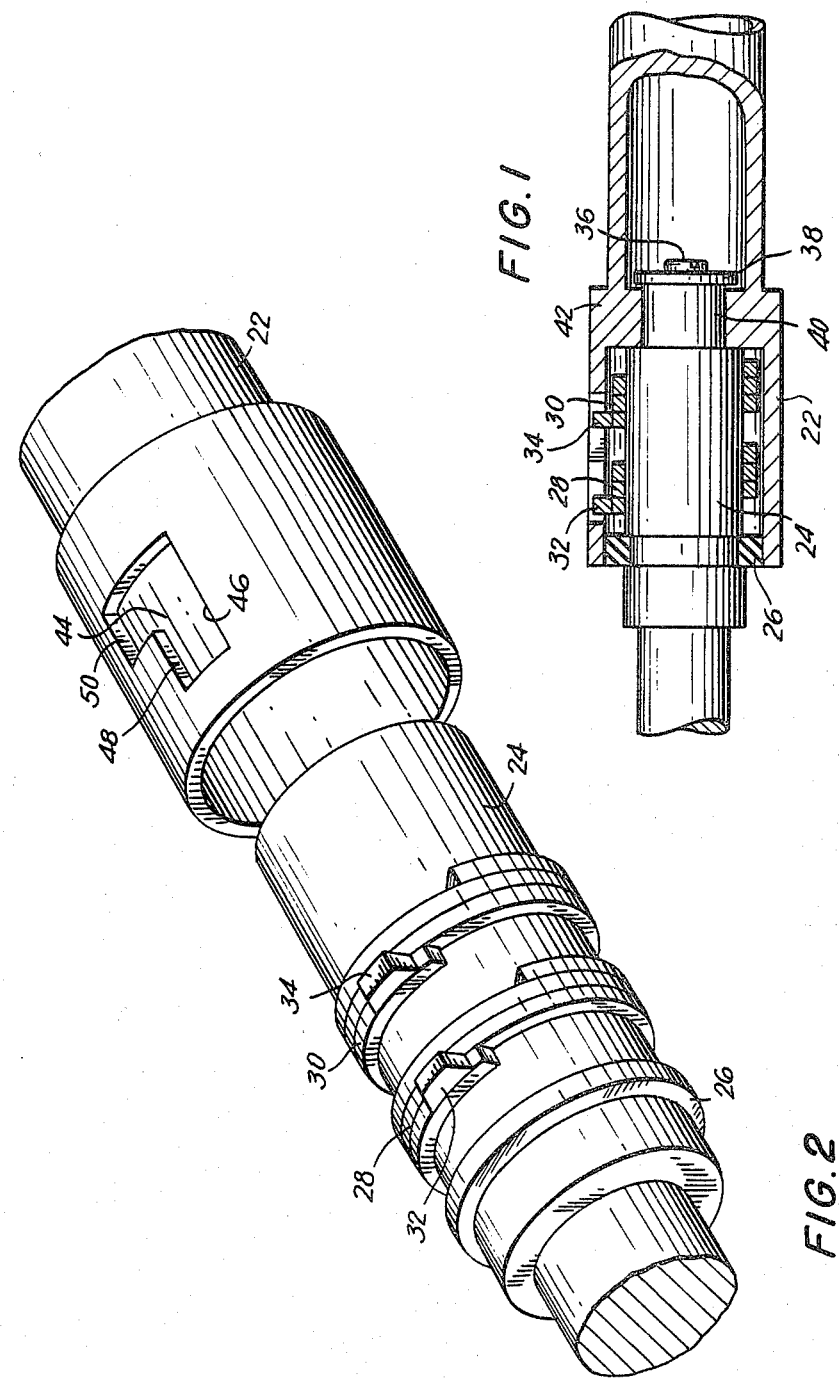

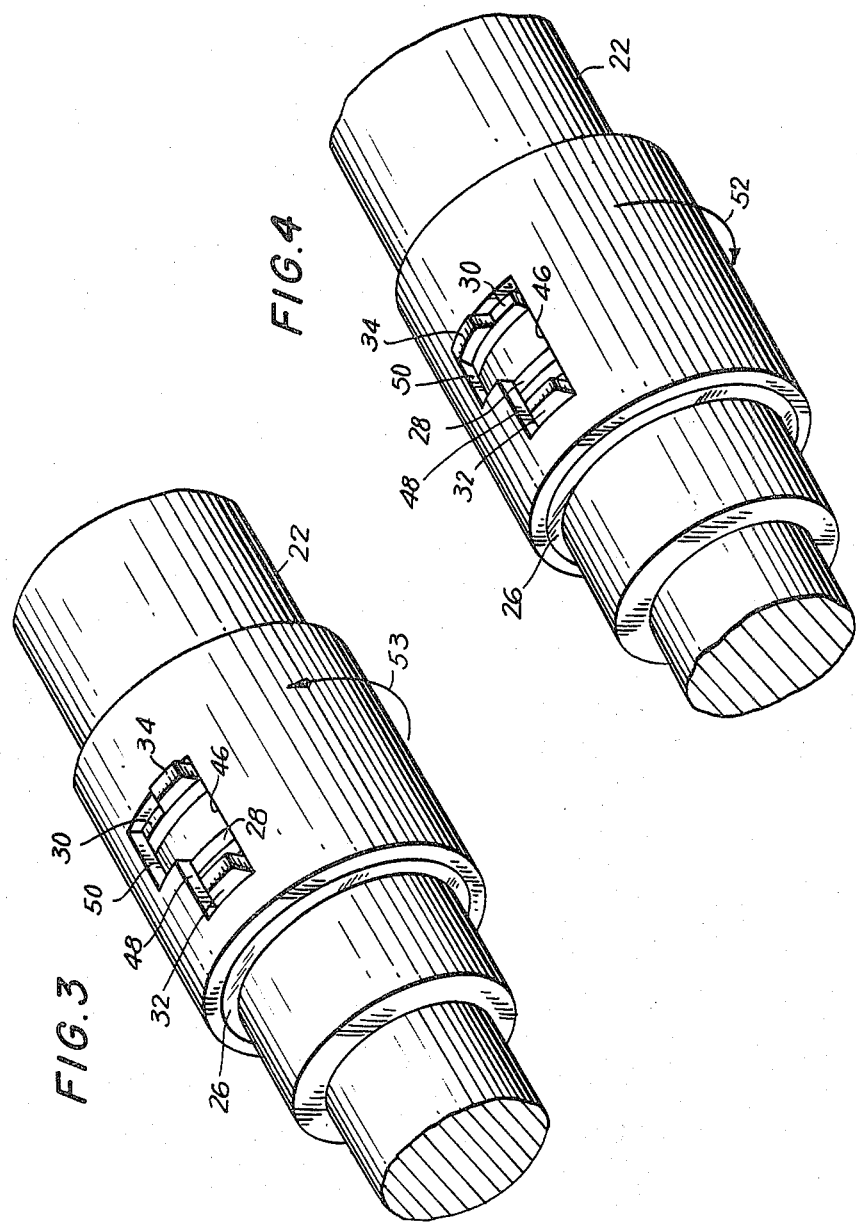

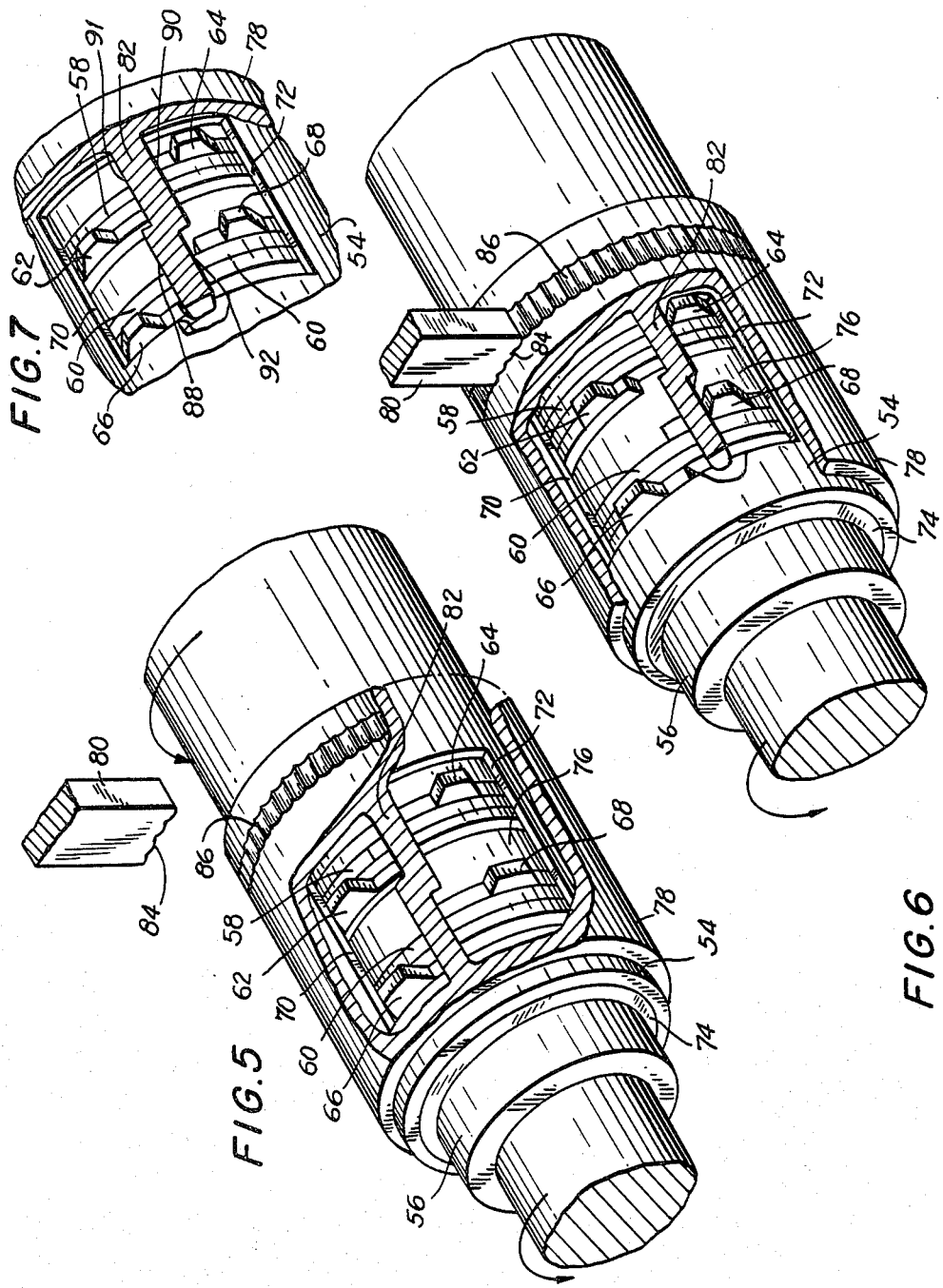

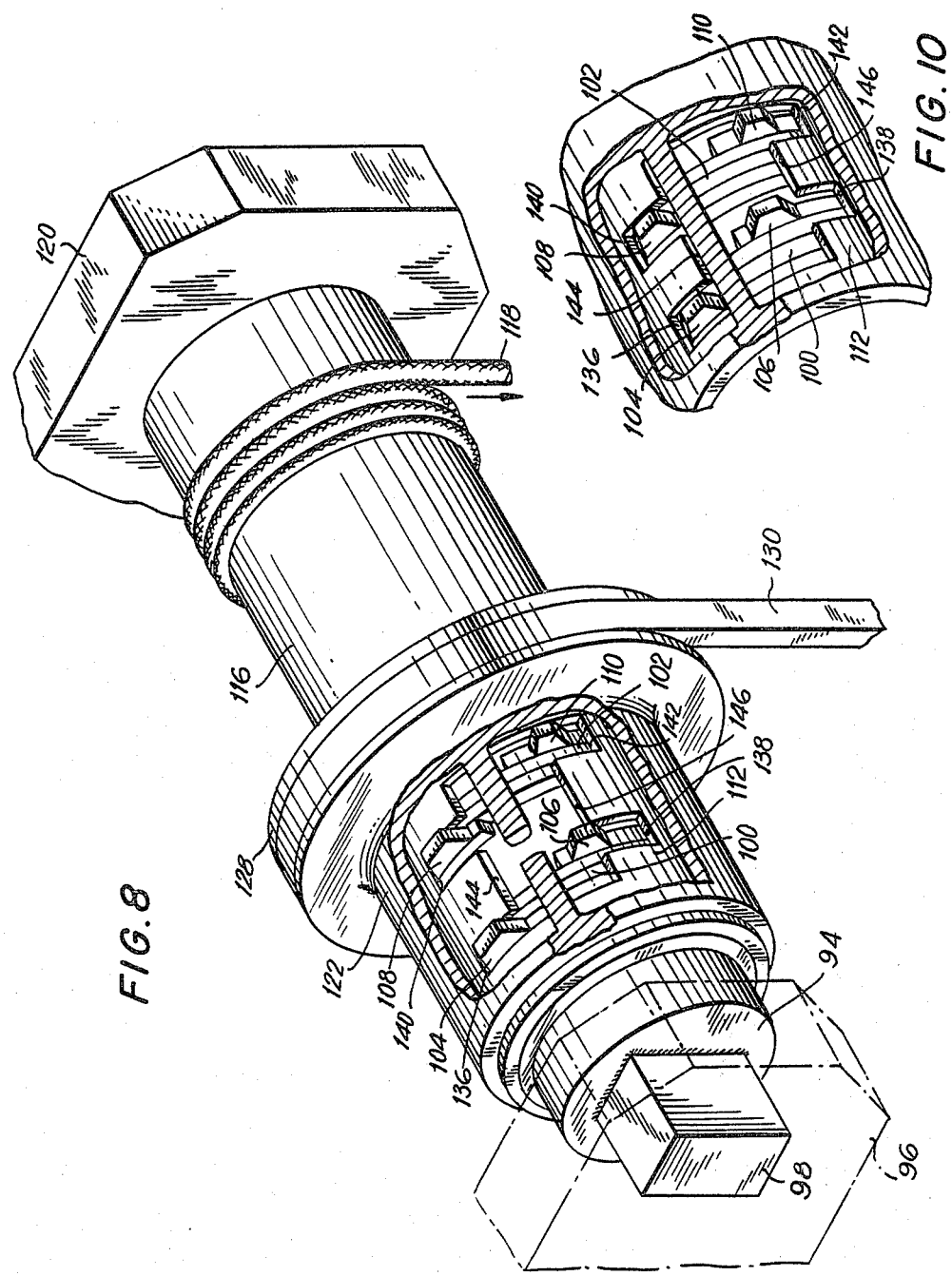

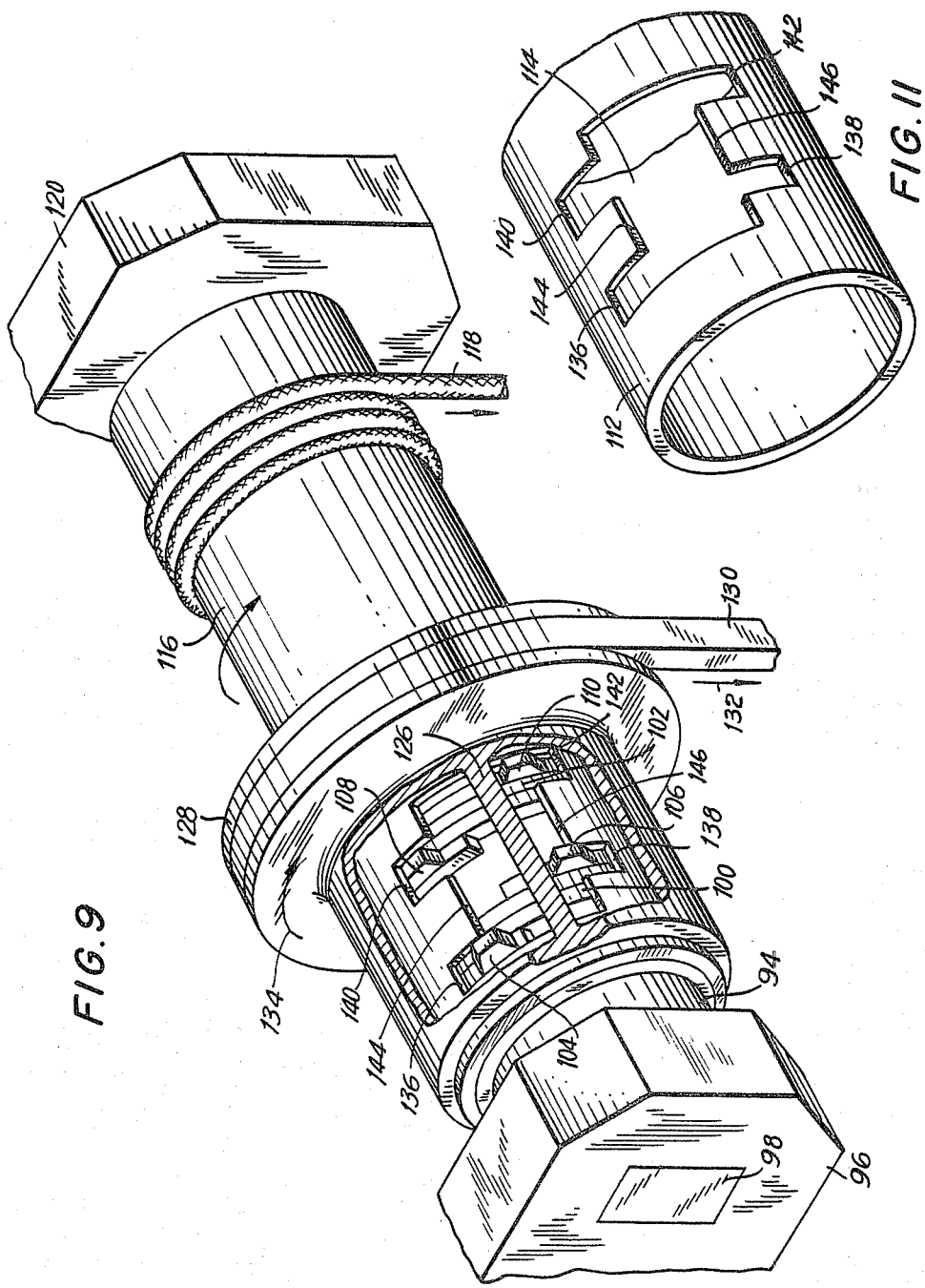

SPRING CLUTCHES

DESCRIPTION

This invention relates to spring clutches and more particularly to spring clutches with multiple springs which operate at different times.

Many variations of spring clutches have been developed and are familiar to those skilled in the art. A typical spring clutch has (1) an input element to which an external source of motive force is connected, (2) an output element from which, when the clutch is engaged, torque can be transmitted to the connected load, (3) a spring which is used to effect the connection between the input and the output elements, and (4) a control element by means of which the clutch is engaged or disengaged. Such a clutch is commonly called a wrap spring clutch because a spring is controllably wrapped either around or within either the input or the output element. When the spring is caused to grip that element, the clutch can transmit torque and is said to be engaged. Conversely, when the spring is caused to be released from the element, the clutch will not transmit more than a small, residual amount of torque and is said to be disengaged. The control element is used to control the action of the spring, causing it to form the mechanical connection between the driving and the driven elements when the clutch is to be engaged, and causing that connection to be substantially interrupted when the clutch is to be disengaged.

The output element can be a core, hub, or cylindrical member, about which the spring is disposed so as to be able to grip it, or it can be a cylindrical sleeve within which the spring is disposed so as to be able to grip the sleeve. In either case, if the clutch is to deliver the torque that is expected of it, the spring must, in its relaxed condition, have a particular dimensional relationship to the core or sleeve with which it co-operates. It is often desired to produce clutches of this type inexpensively and in large quantities by high volume production methods. However, the sizes of the spring and of the input and output elements must be closely controlled if the clutch is to have consistent and predictable operating characteristics. The maintainance of these close dimensional tolerances becomes a significant factor in the cost of such clutches.

It is an object of the present invention to provide a clutch which is much more tolerant of variability in the dimensions of critical elements than has been possible heretofore, while still maintaining consistent torque characteristics.

An overrunning load, that is to say, a load which applies torque to the output of a clutch in the direction which is the same as the direction in which the output moves, can often cause the clutch to operate improperly. This situation arises, for example, when a wrap spring clutch is incorporated in a hoist which is to be used to lower a weight slowly and under control. The overrunning load can cause the clutch to operate in an intermittent fashion, producing a jerky motion that is sometimes called "stairstepping". Stairstepping is caused by the difference between the coefficients of friction for static and dynamic conditions within the clutch. The condition is aggravated by any tendency of the operating system to store energy. For instance, the use of a support cable with excessive elasticity will reinforce any tendency toward stairstepping which the system might have, as will elasticity in the release mechanism of the clutch. Spring clutches having a large number of turns are particularly susceptible to stairstepping because energy must be stored in the spring prior to the release of the clutch.

It is another object of the present invention to provide a clutch in which stairstepping can be eliminated.

Another problem associated with the use of spring clutches is their vulnerability to damage from overloading. Clutches are usually rated by the amount of torque which they are capable of transmitting. Most spring clutches are designed to be used only in situations in which the rated torque will not be exceeded. Such clutches are usually damaged if the rated torque is exceeded by more than the safety margin with which the clutch has been provided.

It is another object of the present invention to provide a wrap spring clutch which will not be damaged even if the rated torque is greatly exceeded.

There are prior art spring clutches which will transmit only a certain, rated amount of torque and slip if the more than the rated torque is needed to maintain a fixed relationship between the driving and the driven elements. However, such clutches usually have only the capability of slipping upon overload, and contain no provision for control. That is to say, they cannot control engagement and disengagement as described above.

It is another object of the present invention to provide both limited slip and controllability in a single clutch.

It is still another object of the present invention to provide a spring clutch in which torque can be transmitted to the load in graduated steps to allow for a slower acceleration of the load than is the case when the maximum rated torque is applied suddenly to the load.

The present invention is a clutch based on the use of wrap springs. The clutch is conceptually of the type described in U.S. Pat. No. 3,920,106, issued on Nov. 18, 1975, and entitled "Reversible Single Revolution Clutch". The present invention differs, however, in that it is not limited to operation as a single revolution clutch, and in several other important respects which will become apparent below. Certain embodiments of the present invention use the same general design disclosed in United States Patent Application Ser. No. 244,975 now U.S. Pat. No. 4,372,432, filed on Mar. 18, 1981 and entitled "Bi-Directional Clutch," and Ser. No. 358,338, filed on Mar. 15, 1982 and entitled "Reversible Tool Handle," both of which are hereby incorporated by reference.

The capability of a spring clutch to transmit torque depends upon a number of factors. Among these are the size and stiffness of the spring wire; the diameter of the hub, the element to which the spring makes a frictional connection when the clutch is engaged; the coefficient of friction between the spring material and the material of the hub; the size of the spring when it is in its relaxed condition; and the number of coils of the spring. The diametral difference between the hub and the spring in its relaxed condition is called the interference.

The torque, T, which will cause a wrap spring clutch to slip is given by the following equation (set forth in "Design equations and nomographs for self-energizing types of spring clutches," Joseph Kaplan and Donald Marshall, Machine Design, Apr. 19, 1956, pp. 107-111):

$$T = [2EIQ/(D+t)^2](e^{-6.28uN} - 1)$$

in which:

E = Young's Modulus for the spring wire
I = Area moment of inertia of the spring wire
Q = Interference between the outside diameter of hub and inside diameter of relaxed spring
D = Outside diameter of hub
t = Thickness of spring wire
u = Coefficient of friction between spring wire and hub material
N = Number of coils of spring.

In actual practice, of the quantities listed above, the ones which pose problems having to do with manufacturing tolerances are the hub diameter, D; the interference, Q; and the coefficient of friction, u. The slip torque of the clutch can be made less sensitive to variations in the absolute magnitudes of all three of these quantities by reducing the number of turns since that reduces the size of the exponential term in the expression above and, therefore, requires that the coefficient term be larger to maintain the same slip torque. If the size of the hub and the interference each varied by a few thousandths of an inch, then the slip torque will be affected less if Q/D is a large number than if it is a small number. Since the exponential contains the product of the coefficient of friction, u, and the number of turns, N, a reduction in the number of turns makes the slip torque much less sensitive to the coefficient of friction.

A typical clutch might be manufactured having the following values for the quantities in the equation given above:

E = 30,000 p.s.i.
Q = 0.005 inches
D = 0.625 inches
t = 0.032 inches
u = 0.11
N = 6 turns.

These values will yield a slip torque of 3.8 inch-pounds. If the number of turns is reduced from 6 to 4 and the interference increased to compensate, then the interference must be 0.021 inches to obtain the same 3.8 inch-pounds of torque. A variation in core size of 0.002 inches will produce a variation of 50% in the slip torque of the clutch with 0.005 inches of interference, but a variation of only 10% in the clutch with 0.021 inches of interference.

Conventional spring clutches normally employ only a small amount of interference and a large number of turns. This is a practical combination in a conventional clutch since the torque rating of the clutch increases exponentially with the number of turns, and the wear rate of the clutch increases linearly with the interference. However, the interference must be made extremely small if the clutch is to retain a useful torque rating and yet slip to protect itself against an overload. The present invention uses two or more springs instead of the usual single spring. By using fewer turns in each of the springs, and more interference than in conventional designs, a clutch can be built which will have a large torque rating while retaining the ability to slip to protect itself against an overload. The wear on both the springs and the surface which the springs grip is increased due to the greater interference, but suitable choices of materials for the component parts can usually reduce the wear to an acceptable level.

There are two physical features which distinguish the subject clutch from those of the prior art. First, the clutch uses more than one spring to effect the connection between the input and output elements. Second, the positioning of the control surfaces within the clutch are such that the several springs can be made to operate at different times.

These features provide the following benefits: (1) a higher torque rating can be obtained within the same sized physical structure, (2) the acceleration of the connected load can be staged to reduce the dynamic forces imposed on the load, and (3) controlled slip can be achieved without the concomitant reduction of torque capacity.

Further objects, features and advantages of the invention will become apparent upon consideration of the following detailed description in conjunction with the drawings, in which:

FIG. 1 is a partial cross-sectional view of a first illustrative embodiment of a slip clutch of our invention;

FIG. 2 is a partially exploded view of the clutch of FIG. 1;

FIG. 3 is another view of the clutch of FIG. 1 in which counterclockwise rotation is indicated by an arrow;

FIG. 4 is a similar view of the clutch of FIG. 1 in which clockwise rotation is indicated by an arrow;

FIG. 5 is a partially cut away view of a second illustrative embodiment of the invention, a controllable clutch, shown in the engaged position;

FIG. 6 shows the clutch of FIG. 5 with the operator for the control element in position to release the clutch;

FIG. 7 is a detail of the clutch of FIG. 5 showing the configuration of the surfaces on the control key;

FIG. 8 is a partially cut away view of a third illustrative embodiment of the invention, shown supporting a load;

FIG. 9 is another view of the clutch of FIG. 8 which shows a load being lowered;

FIG. 10 is a detail view of the clutch of FIG. 8 shown raising a load; and

FIG. 11 is a detail of the housing of the clutch of FIG. 8.

In the simple, overrunning, slip clutch of FIGS. 1-4, hub 24, about whose exterior surface springs 28 and 30 are disposed, is held within housing 22 by screw 36 and washer 38. Coaxial alignment of housing 22 and hub 24 are maintained on one end of the clutch by ring 26 which acts as a bearing between the housing and the hub, and on the other end by reduced hub diameter 40 and necked down housing diameter 42. Shafts or other connecting means such as pulleys or sprockets (not shown) can be attached to housing 22 and hub 24. Opening 44 in housing 22, as seen in FIG. 2, comprises two adjoining rectangular portions of differing arcuate lengths. As illustrated, the two portions of the opening are aligned on one end producing a single surface 46 at that end, while at the other ends surfaces 48 and 50 lie at different angular positions about the center of housing 22. The openings are oriented in this fashion as a matter of convenience, but any other angular positioning would work as well provided that the angles subtended by the openings are not equal. If another angular positioning of the openings were used, then surface 46 would be divided into two surfaces, one for each rectangular portion of the opening. Springs 28 and 30 each have a tab, 32 and 34 respectively, welded or otherwise firmly attached to one end or formed from the spring wire itself. The springs are disposed about hub 24 in like relative orientation, as shown in FIG. 2, tabs 32 and 34 protruding through opening 44 as shown in both FIGS. 3 and 4.

If housing 22 is rotated in the counterclockwise direction as shown by arrow 53 in FIG. 3, surface 46 of opening 44 contacts both tab 32 of spring 28 and tab 34 of spring 30, causing both springs to release their grip on hub 24. Therefore, hub 24 can be easily restrained from rotating along with housing 22. If housing 22 is rotated in the clockwise direction as shown by arrow 52 in FIG. 4, however, then surface 48 of opening 44 will contact tab 32 of spring 28. If the restraint on hub 24 is sufficient to cause spring 28 to slip on hub 24, then, after some slippage has occurred, surface 50 of opening 44 will contact tab 34 of spring 30. After surface 50 has contacted tab 34, spring 30 will also begin to impart torque to hub 24. Additional rotation can cause continued slippage only if the slip torque of springs 28 and 30 combined is less than the torque required to maintain a constant angular relationship between housing 22 and hub 24.

The forces exerted on the tabs by the surfaces of the opening will cause each of the springs to tighten about hub 24 so that each of the springs will impart a torque to hub 24 of a magnitude not greater than the torque required to cause that spring to slip on the hub. The use of multiple springs (only two are shown in FIGS. 1-4) with small numbers of coils increases the probability of obtaining the desired slip torque from each of the springs; it also provides an averaging effect. If housing 22 is again rotated in the direction of arrow 53 through a displacement sufficient to cause surface 46 to again contact both tab 32 and tab 34, then the tabs will be realigned, and another reversal to the direction of arrow 52 will cause the torque to be applied to hub 24 in increments as before.

The operation of this embodiment of the clutch can be reversed by assembling the clutch with the spring reversed. That is, so that the springs would still appear as in FIG. 2 except that the tabs would be on the other ends of the springs.

The embodiment of the invention which is shown in FIGS. 5-7 is a controllable, bi-directional clutch which provides all the benefits of the invention albeit in a slightly different manner. Housing 54 and hub 56 are the output and the input elements respectively; each can be attached to shafts, pulleys, sprockets, gears, or other suitable means for the transmission of torque. Bearing 74 maintains the open end of housing 54 in coaxial alignment with hub 56. This embodiment also includes only two springs 58 and 60 which, in this case, have two tabs each, one tab being firmly attached near each end of each spring. Tabs 62 and 64 are attached to spring 58, and tabs 66 and 68 are attached to spring 60. Opening 76 in housing 54 is rectangular, having axially oriented and parallel load surfaces 70 and 72. Each of these two load surfaces should be thought of as two separate surfaces, one for each spring tab, which can, but need not be, in alignment so as to form a single surface. A control element, in the form of control cylinder 78, is positioned about housing 54 so as to be able to rotate somewhat about the housing and contact tabs 62, 64, 66, and 68 as required in operation. Axial motion is prevented by key 82 which protrudes into opening 76 in housing 54. Referring to FIG. 7, it can be seen that key 82 is made up of two axially oriented portions which are offset with respect to one another, one portion having surfaces 90 and 91, the other portion having surfaces 88 and 92. As can be seen in FIG. 5, actuator 80, which is part of some external control device (either mechanical or electrical) must be able to move radially so that its toothed end 84 can contact matching toothed ring 86 on control cylinder 78.

The operation of this embodiment of the clutch can be appreciated from FIGS. 5, 6, and 7. FIG. 5 shows the clutch transmitting torque from hub 56 to housing 54. Actuator 80 is retracted leaving control cylinder 78 free to rotate along with housing 54 on which it rides. Therefore, control cylinder 78 cannot apply the restraining forces to tabs 64 or 68 which would be necessary to release springs 58 and 60 in this direction of rotation. Springs 58 and 60 are tightly wrapped as a result of the forces exerted on tabs 62 and 66 by surface 70 of opening 76 in housing 54. The spacing of tabs 66 and 68 on spring 60, and tabs 62 and 64 on spring 58 is such that when load surface 70 is in contact with tabs 62 and 66 there can be no contact between load surface 72 and tabs 64 and 68. The bearing of tabs 62 & 66 against surface 70 causes housing 54 to turn with hub 56. In this condition the clutch is said to be engaged.

To disengage the clutch it is only necessary to bring actuator 80 against control cylinder 78, as shown in FIG. 6, so that teeth 84 on the actuator engage toothed ring 86 on control cylinder 78, stopping it and causing key 82 to contact tabs 64 and 68 as hub 56 continues to turn and with it the two springs. When leading tabs 64 and 68 are prevented from rotating, springs 58 and 60 are loosened so that they no longer grip hub 56 which can nevertheless continue to rotate with the springs sliding on its surface. The transmission of torque to housing 54 stops as soon as springs 58 and 60 stop rotating. Spring 58 is left in a slightly different position following the disengagement of the clutch than is spring 60 due to the offset between surfaces 90 and 92 of key 82 as can be seen in FIG. 6. If the clutch is reengaged then surface 70 of housing 54 will contact tab 66 slightly before it contacts tab 62 causing spring 60 to engage slightly earlier than spring 58. If the applied load is sufficient to cause spring 60 to slip on hub 56 then the acceleration of the load will be less than it would be in a clutch which permitted no slippage.

The entire operation of this embodiment is clearly reversible, transmitting torque of the opposite sense when the input rotation is reversed and the clutch is engaged.

In this embodiment the offset position of the two springs is achieved by a step in key 82. (Multiple steps should be used if there are three or more springs.) In the first embodiment the offset is built into the shape of opening 44 in housing 22. In the embodiment of FIGS. 8-11, the offset is a result of slight differences in the positioning of the tabs on the springs. Any of these methods, as well as others, may be used to achieve the desired result. Altough in these examples only two springs have been used, it is clearly possible to use three or more to achieve an even more gradual acceleration of the load. FIGS. 8-11 depict an embodiment of the invention in which the clutch is used to support a load which always tends to move the output element in one direction. Referring to FIG. 8, hub 94 is mounted to stationary structure 96 by rectangular spear 98 which is shaped so as to prevent rotation of hub 94 about its own axis. The two springs 100 and 102 are disposed about hub 94 in exactly the manner of the previous embodiments. Spring 100 has tabs 104 and 106 attached near its ends. Spring 102 has tabs 108 and 110 also placed near its ends, except that in this case tabs 108 and 110 are placed slightly farther apart than are tabs 104 and 106 on spring 100. As before, the tabs are welded to the spring wires or otherwise attached in a manner permitting the tabs to transmit forces approximately as great as the breaking strength of the wire from which the springs are formed. Housing 112 has a configuration very much like those of the earlier embodiments in that it is a cylindrical sleeve in which there is an opening 114. In this embodiment, however, as seen in FIG. 11, opening 114 is not rectangular but has spring load surfaces 136, 138, 140, and 142, and key load surfaces 144 and 146. Control element 122 has an internal key 126 which is similar to that of the previous embodiment with the exception that key 126 does not have an offset portion in the manner of key 82 of FIG. 5. Control element 122 differs from the corresponding parts of the two previous embodiments also in that one end of control element 122 is formed into pulley 128 over which belt 130 can be placed.

Spring tabs 104, 106, 108, and 110 protrude through opening 114 as seen in FIGS. 8-10. Opening 114 is so configured that when any one of the spring tabs is in contact with its respective spring load surface of opening 114, that tab cannot simultaneously contact key 126 of control element 122 since key 126 will first strike its corresponding key load surface. Capstan 116, which is merely an extension of housing 112, forms a drum onto which cord 118, used to support the load, can be wound. The far end of capstan 116 is supported on an internal bearing which is mounted on stationary structure 120.

This embodiment of the clutch is operated by movement of belt 130. When belt 130 is stationary and with the load, as shown in FIG. 8, being supported by cord 118, capstan 116 is prevented from rotating when spring load surfaces 136 and 140 come into contact with tabs 104 and 108 causing springs 100 and 102 to tighten about hub 94 which is prevented from rotating about its own axis. Movement of belt 130 in the direction opposite to arrow 132 of FIG. 9 brings key 126 against key load surface 144 which begins to rotated housing 112 and to raise the load suported by cord 118, and moves spring load surfaces 136 and 140 away from tabs 104 and 108 with which they were in contact. Key 126 then contacts tabs 104 and 108 causing springs 100 and 102 to release their grip on hub 94, permitting continued motion so long as belt 130 is moving in the same direction.

When belt 130 is moved in the direction shown by arrow 132 in FIG. 9, pulley 128 and control element 122 are rotated in the direction of arrow 134 of FIG. 9 causing key 126 to contact spring tabs 106 and 110. Pressure against tabs 106 and 110 causes springs 100 and 102 to release their grip on hub 94 permitting housing 112 to rotate and cord 118 to unwind from capstan 116. These are the conditions which in a conventional spring clutch can produce the uneven motion called "stairstepping".

Stairstepping arises in a single spring clutch because the friction between the spring and the hub is larger when there is no relative movement than it is while movement takes place. When the control element is moved to release the clutch so as to lower the load there is a time during which the control element is moving the tab on one end of the spring and yet the load supporting tab on the other end has not yet begun to move. Clearance between the spring and the hub is accumulated during this time. When enough of the spring has been unwound from the hub so that the remainder can no longer support the load then the load begins to move. Once free to move, the system now has a lower frictional drag and the housing will be accelerated by the falling load until it is rotating more rapidly than the control element. At some point the housing will have moved far enough to take up the clearance between the spring and the hub at which time the spring will again be tightly wound about the hub and the tab will exert enough force on the housing to stop the load and to support it. The clutch will now be engaged again and further movement of the control element will bring about a repetition of the sequence.

The present invention eliminates stairstepping by using two springs, one of which is designed to slip at a torque less than that required to support the load. During raising of the load, key 126 contacts surface 144 of housing 112 as well as keys 104 and 108 of spring 100 and 102 respectively, as shown in FIG. 10. After the load has been raised, the springs are left as shown in FIG. 8, with tab 104 contacting surface 136 and tab 108 in contact with surface 140 and both springs helping to support the load. As shown in FIG. 10, tabs 104 and 106 of spring 100 are closer together than tabs 108 and 110 of spring 102. When pulley 128 is rotated so as to lower the load, key 126 contacts tab 106 before contacting tab 110. Therefore, spring 100 is released, and spring 102, being unable to support the entire load, begins to slip. Spring 102 will not be released if it slips rapidly enough to keep key 126 from contacting tab 110. The friction developed as spring 102 slips prevents rapid acceleration of the load and helps to dissipate the energy of the load being lowered and so to prevent stairstepping.

The shape of opening 114, shown in FIG. 11, provides important additional advantages. When the load supported by cord 118 is raised or lowered by moving belt 130, the forces which cause housing 112 to rotate are imparted by key 126. If the opening in housing 112 were rectangular, as in the previous illustrative embodiments, the motive forces would be imparted by key 126 to two of the spring tabs and thence to a load surface of the rectangular opening. Because the surface areas on the spring tabs which come into contact with key 126 are small, the load forces can develop large pressures which would require that key 126 be made of a material as strong as the steel of which the spring tabs are made. However, control element 122 is a complex part with an external pulley and an internal key. Such a part can be made most efficientlly by a molding process which will reproduce the complex shape but yield a part of lower strength. Making the tabs larger would require extra space within the clutch and could cause uneven loading of the spring which would be damaging. A better solution is to remove the spring tabs from the chain of elements which bear the motive loads. When the clutch of FIGS. 8-11 is operated, key 126 contacts load surface 144 or 146, depending on the direction of rotation, causing housing 112 to rotate. After that rotation has begun, key 126 then contacts the two spring tabs which had been supporting the load causing the springs to release. Since the spring tabs cannot contact both key 126 and the spring load surfaces of opening 114 simultaneously, none of the motive forces required to move the load are transmitted via the spring tabs. Since surfaces 144 and 146 can be much larger in contact area than the spring tabs, the requirement for strength in key 126 is reduced and this reduction in the strength requirement makes a molding process feasible for the manufacture of this part. It should be recognized that the input load surface can contact the load surface on the output element directly, as in the embodiment just described, or via spring tabs as in the embodiment described earlier.

The clutch is bi-directional. If cord 118 is wound in the other direction onto capstan 116, then the entire operation of the clutch will be reversed.

The present invention can be used in many types of spring clutches other than those shown herein. The illustrated embodiments allow the concepts to be easily understood. In these embodiments, the hub (the element with whose surface the springs make frictional contact) is the central piece in the clutch with the springs disposed about it. The outer element (the element which makes contact with the tabs of the springs) is concentrically mounted outside of the springs. However, it is possible to rearrange these elements so that the springs make frictional contact with a cylindrical shell. In such an embodiment, the springs, whose diameters when relaxed are slightly larger than the inside diameters of the shell and whose tabs now point radially inward instead of outward, are slightly contracted to fit within the shell. The inner element now has a radial key which can contact the tabs. The control element must, in this embodiment, be configured so that it can also make the necessary contact with the spring tabs.

The various embodiments discussed above illustrate several means for achieving an offset between the positions at which the spring tabs are contacted by the output element. Under ordinary conditions, in the manufacture of the springs and the elements with which they co-operate there are variations in the sizes of parts. These variations are usually large enough so that a clutch incorporating the present invention, using two or more springs in the manner described above, will handle large inertial loads successfully. Therefore, with the use of multiple springs, properly designed to slip at the appropriate torques, the desireable effects of the invention will occur in the natural course of events in the manner illustrated in FIG. 9. However, for clutches which are required to make rapid speed changes with very heavy loads, it may be desirable to further improve the operation by the inclusion of offsets of one or another type to provide for still more gradual acceleration of load.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

We claim:

1. A spring clutch comprising a first shaft, a coaxially mounted second shaft, and at least first and second springs, helically wound and coaxially disposed between said first and second shafts, for making frictional contact with said first shaft, said at least first and second springs each having a tab near at least one end, said tabs being radially directed toward said second shaft, said second shaft having at least first and second load surfaces for engaging respective ones of said tabs, rotation of one of said shafts in at least one direction causing said at least first and second springs to rotate therewith and to apply a torque in the same direction to the other of said shafts, said tab near said one end of said first spring making contact with said first load surface of said second shaft before said tab near said one end of said second spring makes contact with said second load surface of said second shaft, said first spring slipping on said first shaft prior to said tab near said one end of said second spring making contact with said second load surface of said second shaft if the torque applied to said first shaft exceeds a predetermined value.

2. A spring clutch in accordance with claim 1 further including means for selectively controlling, subsequent to rotation of both of said shafts in said at least one direction, the positioning of said tabs relative to each other in the circumferential direction to permit the sequential contacts of said tabs with said respective load surfaces upon the resumption of rotation of said one of said shafts in said at least one direction.

3. A spring clutch comprising first and second shafts, and at least first and second clutch springs, each having a tab thereon, said first and second clutch springs being wound into helixes whose inside diameters are slightly smaller than the outside diameter of said second shaft, said clutch springs being disposed about said second shaft, said first shaft being rotatably mounted with respect to said second shaft and having at least first and second load surfaces for engaging respective ones of said spring tabs, said load surface of said first shaft being configured such that during rotation of said first shaft in a first direction said first load surface contacts said tab on said first clutch spring to cause said first clutch spring to tighten about and grip said second shaft for imparting to said second shaft up to a predetermined amount of torque and to slip about said second shaft to prevent more than said predetermined amount of torque from being imparted to said second shaft by said first clutch spring, and during continued rotation of said first shaft in said first direction, and after said first load surfaces has contacted said tab on said first clutch spring and caused it to tighten and to slip, said second load surface contacts said tab on said second clutch spring to cause said second clutch spring to tighten about and grip said second shaft for imparting to said second shaft an additional predetermined amount of torque, said first shaft having additional surface means which, upon rotation of said first shaft in a second direction, contacts said tabs on said first and second clutch springs in sequence, to cause said clutch springs to sequentially loosen and release their grips on said second shaft until both of said at least first and second clutch springs have released their grips on said second shaft, whereby said tabs on said at least first and second clutch springs are brought into alignment with one another so that rotation of said first shaft in said first direction will again cause first contact between said first load surface of said first shaft and said tab on said first clutch spring and then second contact between said second load surface of said first shaft and said tab on said second clutch spring.

4. A spring clutch comprising a first element, a second element, at least first and second clutch springs, a control element, said first and second clutch springs being wound into helixes whose inside diameters are slightly smaller than the outside diameter of said first element, said clutch springs being disposed about said first element, said second element being rotatably mounted with respect to said first element and having at least one load surface, and means for selectively placing said control element in a restrained or unrestrained state, in the unrestrained state of which (1) rotation of said first element in a first direction causes a first end of said first clutch spring to contact said at least one load surface and said first clutch spring to tighten about and grip said first element for imparting to said second element a predetermined amount of torque, said first clutch spring slipping about said first element to prevent more than said predetermined amount of torque from being imparted to said second element by said first clutch spring, and (2) further rotation of said first element in said first direction, causes a first end of said second clutch spring to contact said at least one load surface and said second clutch spring to tighten about and grip said first element for imparting to said second element an additional predetermined amount of torque, said second clutch spring slipping rather than imparting more than said additional predetermined amount of torque to said second element, said control element having staggered surfaces which, upon placement of said control element in said restrained state, contact respective second ends of said clutch springs so that said clutch springs release their grips on said first element and have their first ends brought into staggered circumferential positions with respect to one another so that again placing said control element in said unrestrained state will again cause sequential contacts between said first ends of said first and second clutch springs and said at least one load surface.

5. A spring clutch in accordance with claim 4 wherein said second element has two load surfaces, the two ends of each of said at least first and second clutch springs being capable of contacting a respective one of said load surfaces, said first element can rotate in either direction, and the spring clutch is bi-directional and symmetrical in operation in the two directions.

6. A bi-directional spring clutch comprising an input element, a cylindrical output element, at least first and second clutch springs, and a fixed hub, said clutch springs being wound into helixes whose inside diameters are slightly smaller than the outside diameter of said fixed hub, said clutch springs being disposed about said fixed hub, said input element being rotatably mounted with respect to said output element and having first and second load surfaces for respective first and second directions of rotation, said output element being rotatably mounted with respect to said fixed hub, and having first and second load surfaces for engaging respective ones of said first and second input element load surfaces, and further having first and second spring contacting surfaces each for contacting a respective end of each of said clutch springs, the circumferential distance between the two ends of one clutch spring being different from the circumferential distance between the two ends of the other clutch spring.

7. A bi-directional clutch in accordance with claim 6 wherein said input and output elements, and said clutch spring ends, are configured so as to preclude simultaneous contact with each clutch spring end of both an input element load surface and an output element spring contacting surface.

* * * * *